(No Model.)
J. K. PROCTOR & I. W. HUCKINS.
FRICTION COUPLING FOR SHAFTS.
No. 294,672. Patented Mar. 4, 1884.
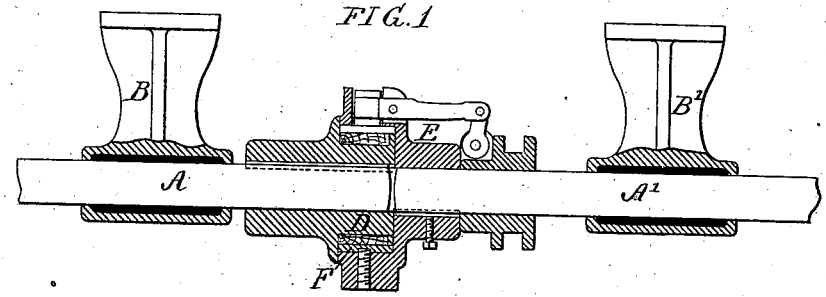
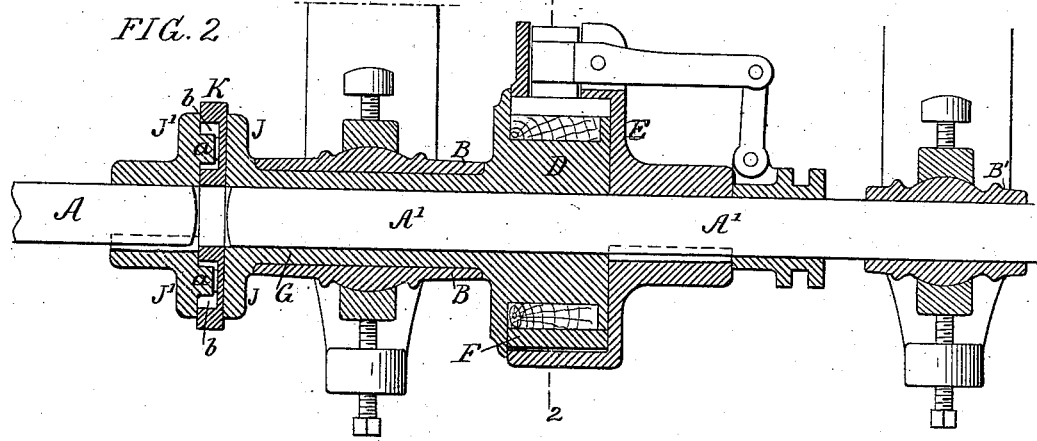
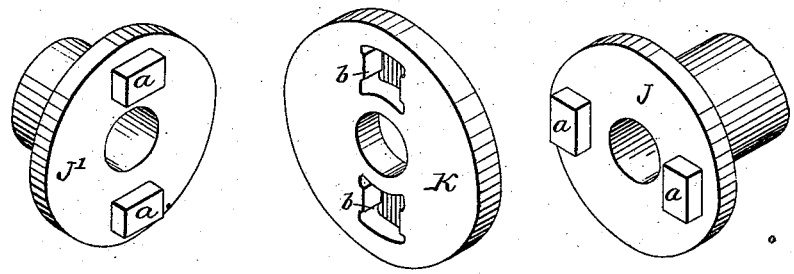
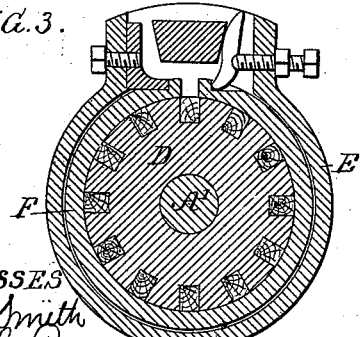
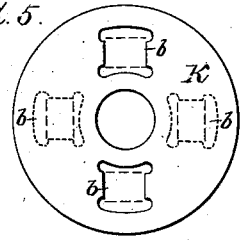
WITNESSES
Harry Smith
John E. Parker
INVENTOR:
Josiah K. Proctor
and
Irving W. Huckins
by their Attorneys
Howson & Sons

UNITED STATES PATENT OFFICE.

JOSIAH K. PROCTOR AND IRVING W. HUCKINS, OF PHILADELPHIA, PENNSYLVANIA, ASSIGNORS TO THE JAMES SMITH WOOLEN MACHINERY COMPANY, OF SAME PLACE.

FRICTION-COUPLING FOR SHAFTS.

SPECIFICATION forming part of Letters Patent No. 294,672, dated March 4, 1884.

Application filed December 3, 1883. (No model.)

*To all whom it may concern:*

Be it known that we, JOSIAH K. PROCTOR and IRVING W. HUCKINS, citizens of the United States, and residents of Philadelphia, Pennsylvania, have invented certain Improvements in Friction-Couplings for Shafts, of which the following is a specification.

The object of our invention is to so construct a friction-coupling for shafts that lateral strains on the shafts or on the parts of the coupling will be effectually resisted; and this object we attain in the manner which we will now proceed to describe, reference being had to the accompanying drawings, in which—

Figure 1 is a longitudinal section of an ordinary friction-coupling of the class to which our invention relates; Fig. 2, a longitudinal section of a friction-coupling for shafts constructed in accordance with our invention; Fig. 3, a transverse section on the line 1 2, Fig. 2; Fig. 4, a perspective view of the parts composing a yielding coupling, forming part of our invention; and Fig. 5, a face view of one of the disks of said coupling.

A A' represent parts of two shafts, A being the driving-shaft, and A' the shaft to be driven; or the reverse of this arrangement may be true without affecting the character of our invention. Ordinarily the shafts are adapted to bearings B B', as shown in Fig. 1, and terminate between these bearings, the shaft A having at the end a projecting hub, D, and the shaft A' carrying at its end a disk, E, with friction-ring F, and means for tightening the same to the hub when it is desired to clutch the two shafts together. When the ring is clamped to the hub, there is a lateral strain upon the parts, and as the ends of both shafts are unsupported, deflection of said shafts is caused, and rapid and uneven wear of the parts results. To overcome this objection, we provide the shaft A with a bearing in both hangers, the hub D forming part of a sleeve, G, which passes through the hanger B, and is connected to the shaft A by a coupling outside of the latter. (See Fig. 2.) By this means all of the lateral strain is brought upon the shaft A', and as the latter has a bearing at the end deflection of the same is impossible, and uneven or severe wear of the parts is effectually prevented.

Any of the ordinary devices may be used for clamping the ring F to the hub D; and any desired form of coupling may be used for connecting the sleeve G to the shaft A; but we prefer the coupling shown in the drawings for this purpose, this coupling being such as to permit vertical or lateral deflection of the shaft A without imparting any strain to the sleeve G. Such deflection is likely to be caused by the bearings for said shaft A being out of line with the bearings B B' of the shaft A', and, in the absence of a yielding coupling between said shaft A and the sleeve, would have a tendency to cause uneven bearing of the sleeve in the bearing B, and uneven and excessive wear.

The coupling comprises two disks, J J', and a central disk, K, the disks J J' being secured, respectively, to the end of the sleeve G and the end of the shaft A, and the disk K occupying a position between the two disks J J'. On each disk J J' are two projecting lugs, *a a*, those of the disk J being at a right angle to those of the disk J', and in the opposite sides of the disk K are formed recesses *b*, for the reception of these lugs, the sides of the lugs bearing against the sides of the recesses, but the latter being elongated radially, so that while the disk K serves as an effective means for transmitting the rotary motion from the sleeve G to the shaft A, or vice versa, it has an amount of lateral or transverse play sufficient to compensate for any ordinary defect in the alignment of the bearings of the two shafts.

If desired, the shaft A may be provided with the clamping devices, and the shaft A' with the hub D; or the essential features of our invention may be applied to other friction-couplings as well as to the hub friction-coupling shown in the drawings, as in all such cases it is advisable to have all parts of the clutch in line with each other. The construction shown in the drawings is, however, preferred.

We claim as our invention—

1. The combination, in a friction-coupling for shafts, of a bearing, B, a sleeve, G, adapted thereto and carrying one part of the clutch, the shaft A', carrying the other part of the clutch and having its end supported in the sleeve, the shaft A, and a coupling between said shaft and the sleeve G, as set forth.

2. The combination, in a friction-coupling for shafts, of a bearing, B, a sleeve, G, adapted thereto and carrying one part of the clutch, the shaft A', carrying the other part of the clutch and having its end supported in the sleeve, the shaft A, and a yielding coupling between said shaft and the sleeve G, as set forth.

3. The combination of the bearing B, the sleeve G, adapted thereto and having the hub D, the shaft A', having a disk with friction-band F and clamping devices therefor, and having its ends supported in the sleeve, the shaft A, and a coupling between said shaft and the sleeve G, as specified.

4. The combination, in a friction-coupling for shafts, of the bearing B, a sleeve, G, adapted thereto, carrying one part of the clutch and having a disk, J, with projecting lugs $a$, a shaft, A', carrying the other part of the clutch and having its end supported in the sleeve, a shaft A, having a disk, J', with lugs $a$ at right angles to those of the disk J, and a disk, K, having radially-elongated openings for the reception of the lugs $a$, as set forth.

In testimony whereof we have signed our names to this specification in the presence of two subscribing witnesses.

JOSIAH K. PROCTOR.
IRVING W. HUCKINS.

Witnesses:
JOHN M. CLAYTON,
HARRY SMITH.